PULSE WIDTH DISCRIMINATOR

Filed Oct. 9, 1945

2 Sheets-Sheet 1

Inventors
CONRAD H. HOEPPNER
CARL HARRISON SMITH, JR.

By Ralph L. Chappell
Attorney

Inventors
CONRAD H. HOEPPNER
CARL HARRISON SMITH, JR.
By Ralph L Chappell
Attorney

United States Patent Office 2,744,196

Patented May 1, 1956

2,744,196

PULSE WIDTH DISCRIMINATOR

Conrad H. Hoeppner, Washington, D. C., and Carl Harrison Smith, Jr., Arlington, Va.

Application October 9, 1945, Serial No. 621,402

6 Claims. (Cl. 250—27)

(Granted under Title 35, U. S. Code (1952), sec. 266)

This invention relates in general to electronic circuits having discriminatory response characteristics and in particular to an electronic circuit for pulse time duration discrimination.

In radio, radar, television, and other electronic fields, it frequently occurs that a number of different potential variations may exist at the input to a component electronic circuit either fortuitously or by intention. If all of such variations are not to be impressed upon the component circuit, it is necessary to provide an intervening circuit with the ability to discriminate between those variations intended for ultimate application to the component circuit and those variations the effect of which would be undesirable. Some characteristic or characteristics of the potential variations must be selected as a basis for pulse discrimination and among such characteristics are time duration, polarity, rate of change, and amplitude.

Given such a basis and a suitable intervening circuit, many useful applications may result. For example, a means of pulse coding is provided in which intelligence is conveyed by means of electrical impulses endowed with the chosen characteristic in the form in which it will be favored by the receiver of the message. All those electrical impulses not so endowed, whether they be deliberately introduced so as to disguise a communication for secrecy purposes or reach the receiver from man-made or natural sources so as to constitute accidental or deliberate interference, are rejected by the intervening circuit. An obvious extension of such a code pulsing system is to provide a receiver with a plurality of intervening circuits, each so constructed as to select and favor its particular type of electrical impulse. In this way a multiplicity of communication channels may be provided. The endowment of an electrical impulse with the chosen characteristic in the form in which it will be favored does not necessarily operate to prevent a variation in another characteristic which can be put to a useful purpose. Thus, a pulse which may be restricted as to its time duration so as to be favored by a pulse width discrimination circuit can also be amplitude modulated so as to convey intelligence or provide a second means of discrimination.

It is an object of this invention to provide a circuit which is responsive only to potential variations or electrical impulses of a certain time duration and which is unresponsive to potential variations or electrical impulses of all other time durations.

It is another object of this invention to provide a circuit which can be employed between a source of potential variations or electrical impulses and the receiver thereof as an intervening circuit which shields from such receiver all variations or pulses except those having a certain definite preselected time duration.

It is another object of this invention to provide a discrimination circuit the discriminatory action of which is based upon certain definite characteristics of the applied input signal.

Other objects and features of this invention will become apparent upon a careful consideration of the following detailed description when taken together with the accompanying drawings in which:

Fig. 2A is a series of waveforms useful in explaining the operation of the circuit shown in Fig. 2;

Fig. 3A is a series of waveforms useful in explaining the operation of the circuit shown in Fig. 3;

Fig. 5A is a series of waveforms useful in explaining the operation of the circuit shown in Fig. 5.

Figure 1:
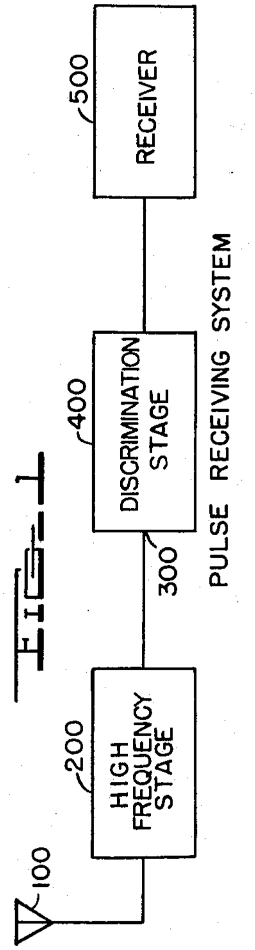
Fig. 1 is a simple block diagram of a pulse receiving system utilizing one embodiment of this invention.

Reference is now had in particular to Fig. 1 which is illustrative of a pulse receiving system wherein a discrimination circuit is employed to repulse undesired video signals in a pulse receiving system. Pulses or bursts of high frequency energy received by antenna 100, amplified and detected by high frequency stage 200 are impressed, in the form of the envelope of the high frequency pulses of energy, to input 300 of discrimination stage 400. Since the pulses of high frequency energy reaching antenna 100 may comprise not only a desired signal but also man-made and fortuitous interfering signals of a frequency which high frequency stage 200 will not reject, and since high frequency stage 200 may itself be a source of interfering signal, it is the function of discrimination stage 400 to shield from receiver 500 all pulses not having the time duration characteristics of the desired signal. The output circuit of high frequency stage 200, not shown, is so constructed that only signals of negative polarity and steep leading and trailing edges are applied to input 300. Further, these signals are all of the same amplitude, the result being that, as they are applied to discrimination stage 400, their only substantial difference lies in the characteristic of time duration.

Figure 2:
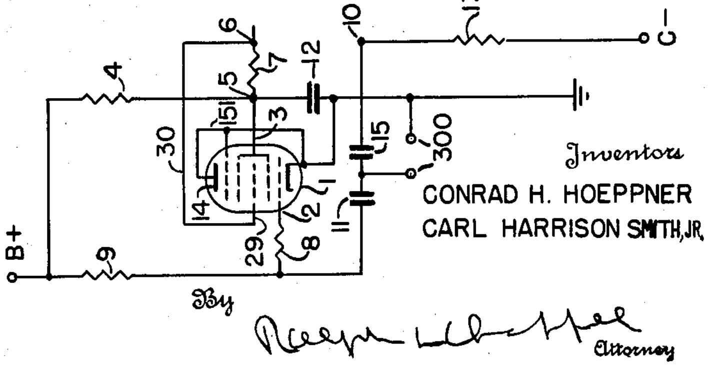
Fig. 2 is the circuit diagram of a partial embodiment of this invention.

In general, the invention, a partial embodiment of which is shown in Fig. 2, operates under the influence of three RC circuits. Each of these consists essentially of resistive elements and capacitive elements connected in series in such a manner that two of them constitute differentiating circuits, and one of them an integrating circuit. The terms "differentiating" and "integrating" are, of course, used in the commonly accepted electrical sense rather than in a rigorous mathematical sense. Advantage is taken of the fact that the charge on and voltage across a capacitor cannot be changed instantaneously in any circuit containing resistance. By proper choice of the values of capacitance and the resistance in the series connections, the time required for charging of the capacitive elements with respect to the time duration of applied electrical impulses is controlled to accomplish the pulse width discrimination taught by this invention.

One of the differentiating circuits mentioned above possesses a relatively long time constant characteristic, i. e., the time required for the voltage across the capacitor to approach that initially applied to the circuit is greater than the time duration of the pulse to be favored. This circuit is employed to control the output of a vacuum tube in such a manner that its anode potential tends to rise abruptly in synchronism with the leading edge of an applied pulse and tends to decay abruptly either in synchronism with the trailing edge of such an applied pulse or at the end of a time interval determined by the time constant of the circuit if that interval is exceeded by the duration of the applied pulse. The integrating circuit is employed to convert this tendency toward an abrupt rise into a gradual increase in voltage which is nearly linear with respect to time and in combination with the vacuum tube to reduce the tendency toward an abrupt decay. There is thus provided at the output point of the integating circuit a waveform which increases in a nearly linear manner up to a potential determined either by the duration of the applied pulse or by the time constant of the above described differentiating circuit and which then decreases in a rapid but not abrupt manner to the quiescent potential existing prior to the application of the pulse. The maximum amplitude is attained by this waveform only when the pulse duration is equal to or greater than the interval determined by the differentiating circuit time constant. The other differentiating circuit, which has a short time constant characteristic, is employed to derive from the applied pulse a sharp negative pulse and a sharp positive pulse coincidental with its leading and trailing edges respectively. This sharp positive pulse thus derived is then combined with the output of the integrating circuit either by means of a network so as to result in superposition, or by coincidental action on separate electrodes of a vacuum tube, to cause a discriminator circuit output pulse only when the applied pulse is of a predetermined time duration. The exact manner in which this is accomplished may be better understood by reference to the accompanying drawings.

In particular, tube 1 of Fig. 2 represents a multigrid vacuum tube so connected that it functions as a triode in which first control grid 2 acts as the grid and in which dual screen grid 3 acts as the anode. Plate 14 is connected to a cathode potential through lead 151 and thus attracts none of the electrons which leave the cathode space charge. For immediate purposes, therefore, tube 1 may be regarded as a simple triode. Resistor 4, connected between screen grid 3 (the anode) and B+ supply potential, acts as the anode circuit resistor so that signals appear at point 5 in accordance with variations of potential at grid 2. In the absence of a negative signal at input terminals 300, grid 2, which is connected to B+ through resistors 8 and 9, remains at substantially cathode or ground potential by virtue of grid current flow. Tube 1 is thereby held in a highly conducting condition, point 5 is at a potential slightly above ground and there is very little charge on capacitor 12 in the quiescent condition of the circuit.

The leading edge of a negative pulse applied at input 300 is communicated to grid 2 by resistor 8 and by the long time constant differentiating circuit comprising resistor 9 and capacitor 11, so as to cut off the flow of plate current in tube 1. The values of the differentiating circuit components are chosen such that, as capacitor 11 charges through resistance 9, the potential of grid 2 rises to the value which will again permit conduction by tube 1 in a length of time approximately equal to the time duration of a negative pulse applied to input 300 which the circuit is constructed to favor.

During the interval of the pulse, when tube current is cut off, screen grid 3 attempts to rise abruptly to B+ potential but is prevented from doing so by the necessity of charging capacitor 12 through resistor 4. Thus, resistor 4 and capacitor 12 constitute an integrating circuit insofar as point 5 is concerned and serve to cause a voltage which experiences a nearly linear increase at that point when tube 1 is cut off. As soon as tube 1 is rendered conducting, the potential at point 5 decreases rapidly as capacitor 12 discharges through the relatively low screen grid to cathode resistance of the tube.

The negative pulse applied to input 300 also is differentiated by the short time constant circuit comprising capacitor 15 and resistor 13 so that there appears at point 10 a sharp negative pulse in response to the leading edge and a sharp positive pulse in response to the trailing edge of the input pulse. It will be seen that a sharp positive pulse will always appear at point 10 in synchronism with the greatest amplitude reached by the waveform appearing at point 5 except when the applied pulse is of a time duration greater than the interval required for tube 1 to be rendered conducting by the charging of capacitor 11. The manner in which this synchronism or its absence occurs is apparent by reference to the waveforms of Fig. 2A.

In Fig. 2A waveform 16 is representative of a series of negative pulses applied at input 300. As hereinbefore described, these negative pulses possess steep leading and trailing edges and are all of the same amplitude so that their only substantial difference lies in the characteristic of time duration. All three of the pulses *a*, *b*, and *c*, since they are of uniform amplitude, serve to drive grid 2 of tube 1 below cutoff potential by the same amount. Pulse *a*, which is of short time duration compared with the time required for capacitor 11 to charge up sufficiently for tube 1 to conduct, causes a variation at grid 2 represented by differentiated pulse *a′* of waveform 17. The potential level to which grid 2 must be raised by charging of capacitor 11 in order to cause conduction by tube 1 is indicated by line *c.o.* of that waveform. The trailing edge of pulse *a* returns tube 1 to conducting condition and circuit quiescence follows. The short interval during which tube 1 was non-conducting allowed capacitor 12 to charge only slightly as illustrated by integrated pulse *a″* of waveform 18. The sharp negative and positive pulses appearing at point 10 are shown in their time relation to the foregoing waveforms by waveform 19. It will be observed that the sharp positive element of *a‴* corresponding to the trailing edge of pulse *a* occurs in synchronism with the greatest amplitude reached by the integrated pulse *a″*.

Pulse *b*, which has a time duration approximately equal to the time required for capacitor 11 to charge up sufficiently for tube 1 to conduct, causes a variation at grid 2 represented by differentiated pulse *b′* of waveform 17. This interval of non-conduction of tube 1 is the greatest which will occur regardless of pulse duration so that capacitor 12 receives its maximum charge which can be imparted to it during any applied signal as illustrated by integrated pulse *b″* of waveform 18. The corresponding sharp negative and positive pulses appearing at point 10 are shown by *b‴* of waveform 19. It will be observed that the sharp positive element of *b‴* corresponding to the trailing edge of pulse *b* again occurs in synchronism with the greatest amplitude reached by integrated pulse *b″*. It will also be observed that the greatest amplitude of *b″* exceeds that of *a″* by an amount which is determined by the respective intervals during which tube 1 was held non-conducting.

Pulse *c*, which has a time duration such that tube 1 is rendered conducting by the charge on capacitor 11 before the trailing edge arrives, causes a variation at grid 2 represented by differentiated pulse *c′* of waveform 17. The discharge of capacitor 12 through tube 1, which is represented by the trailing edge of integrated pulse *c″* is virtually complete by the time the trailing edge of the input pulse arrives to create the sharp positive element of *c‴* of waveform 19. From this it can be seen that, when the input pulse duration is such as to allow tube 1 to be rendered conducting by the charging of capacitor 11, the sharp positive pulse occurs at point 10 out of synchronism with the greatest amplitude reached by the integrated pulse at point 5.

According to the teachings of this invention, a variety of means may be employed to provide pulse width discrimination by taking advantage of the fact that the sharp positive pulse appears at point 10 and the potential at point 5 reaches a maximum in synchronism only when a pulse width of a pre-determined duration is applied at input 300.

Figure 3:
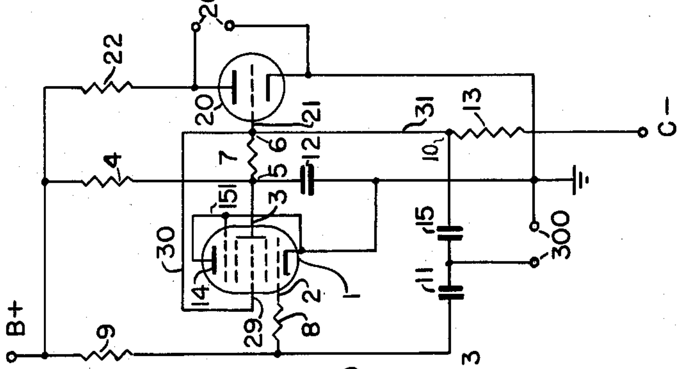
Fig. 3 is the circuit diagram of one embodiment of this invention.

One such embodiment is shown in Fig. 3 and consists of superposing the sharp positive pulse which appears at point 10 on the potential which appears at point 5 by means of a network so as to cause the combined potential to appear at point 6. This combined potential is great enough to unbias tube 20 and create an output signal at terminals 26 only when the superposition results in a combination of maximum amplitude. In Fig. 3, which includes the entire circuit of Fig. 2, control grid 21 of vacuum tube 20 has been connected to point 5 through resistor 7 and to point 10 by lead 31. The values of resistors 7 and 13 have been chosen with respect to C— potential such that, in the absence of any applied signals at input 300, tube 20 is biased off by the potential existing at grid 21. The amount of the bias thus provided is such that neither the sharp positive pulse appearing at point 10 or the gradually increasing potential appearing at point 5 is alone sufficient to cause tube 20 to conduct. Furthermore, the bias dictates that only the superposed combination of the two at point 6 which results from a pulse duration such that a sharp positive pulse appears at point 10 in synchronism with the maximum amplitude attainable at point 5 will allow current flow in tube 20. When tube 20 is rendered conducting by the pulse of selected duration, a voltage drop occurs across resistor 22 and an output signal appears at terminals 26. Thus, pulse width discrimination is provided by the fact that a pulse too narrow, such as pulse *a* of waveform 16, permits point 5 to attain too low an amplitude for the superposition at point 6 to result in a signal at output 26, and a pulse too wide, such as pulse *c* of waveform 16, does not provide the required synchronism of superposition. In Fig. 3A are shown waveforms illustrating this action. Waveform 24, the variations in which correspond to the input pulses *a*, *b*, and *c* of waveform 16, represents the superposition which occurs at point 6 and which is applied to grid 21 of tube 20. The combination *aa*, resulting from narrow pulse *a*, reaches an amplitude *x* which is too low to reach the cutoff potential indicated by line *c.o.* The combination *bb*, resulting from pulse *b* of the predetermined time duration, and consisting of the sharp positive pulse and the maximum integrated potential superposed in synchronism, reaches amplitude *y* which exceeds the cutoff bias of tube 20 and signal *bb'* of waveform 25 appears at output 26. The combination *cc*, resulting from wide pulse *c* represents a non-synchronous condition so that the superposition results in reaching only amplitude *z* which falls short of unbiasing tube 20 and no output signal appears at terminals 26.

Figure 4:
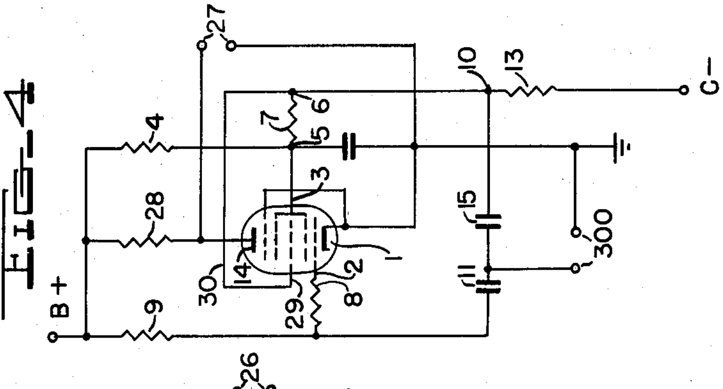
Fig. 4 is the circuit diagram of a variant embodiment of this invention.

A variant embodiment which also employs superposition by means of a network but which is provided with a different arrangement of amplitude response is illustrated by the circuit diagram of Fig. 4. As in the case of the circuit of Fig. 3, advantage is taken of the action of the circuit of Fig. 2 to screen front output terminals 27 any but those of such variations that appear at point 6 which are of maximum amplitude.

The circuit of Fig. 4 again includes the entire circuit of Fig. 2 with the exception of certain changes which permit plate 14 to act as an anode and to provide thereby a point of output. Plate 14 has been connected to B+ potential through resistor 28 and is capable of collecting electrons from the cathode space charge during such times as control grid 2 and control grid 29 are both above cutoff potential. The flow of plate current through resistor 28 during such times yields an output pulse at terminal 27.

By reference to waveform 17 of Fig. 2A it will be seen that grid 2 is raised above cutoff and permits conduction either by virtue of the action of the trailing edge of an applied pulse as at *a'* and *b'* or by the time controlled charging of capacitor 11 as at *c'*. On the other hand, the other condition precedent to conduction is established by the potential at point 6. In the circuit of Fig. 4, the values of resistors 7 and 13 have been so chosen with respect to the voltage variations appearing at point 5 and C— potential that the potential at point 6, which is communicated to grid 29 by lead 30, prevents the flow of electrons to plate 14 except when superposition maximizes that potential. Such superposition occurs coincident with the trailing edge of a pulse having the predetermined time duration which also results in raising grid 2 above cutoff. Thus, a pulse of proper time duration satisfies both conditions for the passage of current through resistor 28 and hence for the appearance of an output pulse at terminals 27. Pulses either of too short or too long a time duration fail to unbias grid 29 and any output is thereby suppressed from terminals 27.

This action is illustrated in waveform 17 of Fig. 2A and waveform 24 of Fig. 3A. A narrow pulse, such as yields corresponding variations *a'* and *aa*, and a wide pulse such as yields variations *c'* and *cc*, fail to raise the potential of point 6 and grid 29 to the level marked by a line *c.o.* of waveform 24 and thus fail to cause electron flow to plate 14. A pulse of the selected width, such as yields variations *b'* and *bb* succeeds in raising the potential of grid 29 above the level marked by line *c.o.* At the same instant, grid 2 is raised above its cutoff potential as indicated by *b'* and current flows through resistor 28 causing output pulse *bb'* at terminals 27.

Figure 5:
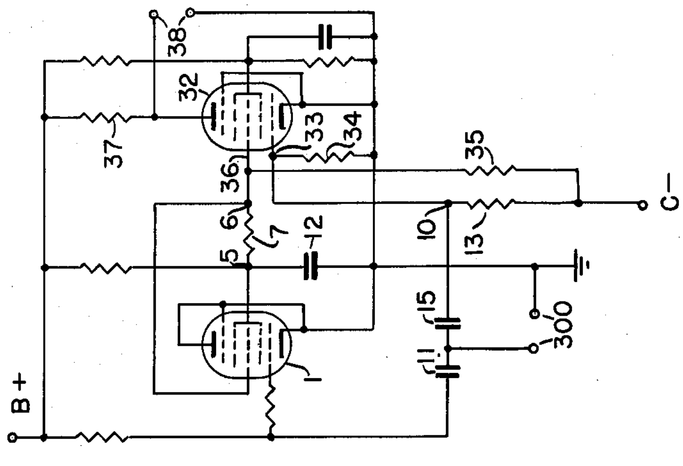
Fig. 5 is the circuit diagram of a second variant embodiment of this invention.
Figure 3:
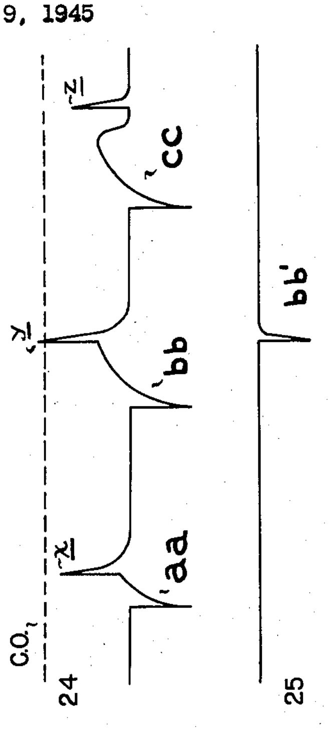
Figure 5:
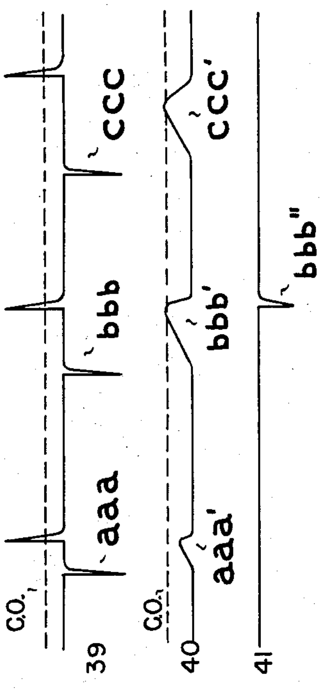
Figure 2:
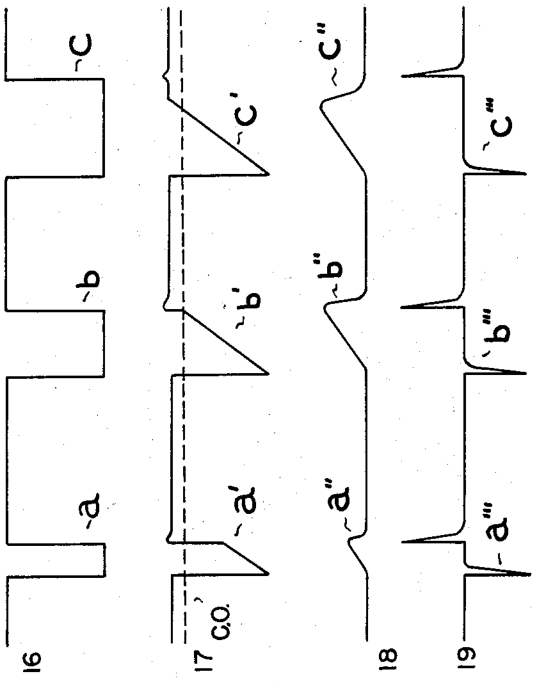

A second variant embodiment which does not employ superposition by network means but which employs combination of the variations appearing at points 5 and 10 by applying them to different control electrodes of a vacuum tube is shown in Fig. 5. In this embodiment multigrid vacuum tube 32 is provided as a means of indicating the coincidence in time of a sharp positive pulse at point 10 and the maximum attainable potential at point 5. The quiescent potential at point 10 and hence at grid 33 is so determined by connection to C— potential through resistor 13 and to ground potential through resistor 34 that tube 32 can conduct only during the sharp positive pulses which correspond to the trailing edges of pulses applied to input 300. A further restriction is placed on conduction by tube 32 by the fact that point 6 is so connected to point 5 through resistor 7 and to C— potential through resistor 35 that grid 36 is maintained below cut off potential except when the integrated potential at point 5 attains its maximum possible value. When synchronism between the unbiasing voltages on grids 33 and 36 occurs, as it does only when a pulse of proper length is applied to input 300, tube 32 conducts, there is a voltage drop across resistor 37, and an output pulse appears at terminals 38. Thus, the circuit of Fig. 5 achieves discrimination against pulses too narrow and pulses too wide and favors pulses of a predetermined time duration by combining the actions of three RC circuits in the control of the electron stream of a vacuum tube.

In Fig. 5A are shown waveforms illustrative of this action. Waveform 39 represents the sharp negative and positive pulses appearing at point 10 and hence grid 33 of tube 32 in response to a series of input pulses at terminals 300 such as represented by waveform 16 of Fig. 2A. The potential to which grid 33 must be raised to permit conduction by tube 32 is indicated by line *c.o.* Waveform 40 represents the integrated pulses appearing at point 5 as communicated to point 6 through resistor 7. Line *c.o.* on this waveform indicates the potential to which grid 36 must be raised to allow current flow in tube 32. Pulse *a* raises grid 33 above cutoff as at *aaa* but fails to unbias grid 36. Thus no output appears at terminals 38 in response to a narrow pulse. Pulse *b* unbiases both grid 33 and grid 36 as at *bbb* and *bbb'* in synchronism and output pulse *bbb''* of waveform 41 therefore appears at 38. Pulse *c* unbiases both grid 33 and grid 36 as at *ccc* and *ccc'* but this action is non-synchronous and no output pulse appears at terminals 38.

With respect to the embodiment shown in Figs. 3 and 5, it will be apparent that tube 1 can be replaced by a conventional triode since the action of that tube is precisely the same as described in connection with the circuit of Fig. 2 in which multigrid tube 1 was connected as a simple triode. With such an arrangement in Fig. 3, both triodes may be in the same envelope with the resulting advantage of compactness. Further, the amplitude responsive device actuated by the potential variations at point 6 in the circuits of Figs. 3 and 4 may take a number of forms, only two of which are shown here. In instances, it may be desirable to provide a compensating capacitor across resistor 7 to improve coupling but this and similar minor changes do not exceed the spirit of the invention.

In the manner taught, three resistive-capacitive combinations, one representing a long time constant differentiator, one a short time constant differentiator and one an integrator, have been utilized to achieve discrimination as between the time duration characteristics of electrical impulses. It will be apparent that a time duration or pulse width discrimination circuit constructed in accordance with the teachings of this invention will have a wide variety of applications in radio, radar, television and other electronic fields whenever discrimination between voltage variations is desirable and the time durations of such variations can be used as the basis for such discrimination. It will also be apparent that a pulse width discrimination circuit constructed as taught by this invention may be used in combination with other circuits, also discriminatory in response, whose action is based on other characteristics of the input signal such as amplitude, polarity or rate of change.

Since certain further change may be made in the foregoing constructions and different embodiments of the inventions may be made without departing from the scope thereof, it is intended that all matter shown in the accompanying drawings or set forth in the accompanying specification shall be interpreted as illustrative and not in a limiting sense.

The invention described herein may be manufactured and used by or for the Government of the United States of America for governmental purposes without the payment of any royalty thereon or therefor.

What is claimed is:

1. A pulse width discriminator for selecting pulses having a predetermined duration comprising, a pair of differentiator circuits receiving said pulses in parallel, the first of said pair of differentiator circuits having a discharge time equal to said predetermined duration, an integrating circuit responsive to the output of said first differentiator to produce a sawtooth pulse during the discharge of each pulse in said first differentiator, means combining the output of the second of said pair of differentiator circuits and said integrating circuit, and means producing an output pulse when said combined output exceeds a predetermined amplitude.

2. A pulse width discriminator comprising a vacuum tube means, a first time constant circuit differentiating and coupling applied pulse signals to said tube to hold said tube nonconductive while each pulse discharges from its initial charge on said first time constant circuit, the time constant of said first circuit corresponding to the pulse width to be selected, a second time constant circuit receiving and producing a rising voltage from each variation at the output of said tube, a third time constant circuit receiving and differentiating said applied pulse signals and having a time constant shorter than that of said first time constant circuit, means combining the output of said third time constant circuit with the output of second time constant circuit and means producing pulses only when said combination exceeds a predetermined amplitude.

3. A pulse width discriminator comprising a vacuum tube means, a first time constant circuit differentiating and coupling applied pulse signals to said tube to hold said tube nonconductive while each pulse discharges from its initial charge on said first time constant circuit, the time constant of said first circuit corresponding to the pulse width to be selected, a second time constant circuit receiving and producing a rising voltage from each variation at the output of said tube, a third time constant circuit receiving and differentiating said applied pulse signals and having time constant shorter than that of said first time constant circuit, network means superposing the output of said third time constant circuit on the output of said second time constant circuit, and means responsive to said superposed outputs producing pulses only when said superposition exceeds a predetermined amplitude.

4. A pulse width discriminator comprising a first vacuum tube means having at least an anode, a control grid, and a cathode, a first time constant circuit differentiating and coupling applied pulse signals to the grid of said tube to change the conducting state of said tube in response to a pulse leading edge, said differentiating circuit having a sufficiently long time constant to hold said tube in its changed state for a predetermined period in response to each pulse equal to or exceeding said period, said state changing back in response to a pulse trailing edge occurring during said period, a second time constant circuit connected to the anode of said first tube to produce an integrated pulse having a waveform which increases constantly during the period said first tube's conducting condition is changed, a third time constant circuit receiving and differentiating said applied pulse signals and having a time constant shorter than that of said first time constant circuit, network means superposing the output of said third time constant circuit on the output of said second time constant circuit and a second vacuum tube means receiving said combined outputs and adapted to respond only when said superposition results in an amplitude which exceeds a preselected amplitude.

5. A pulse width discriminator comprising a vacuum tube means having at least an anode, an anode acting electrode, a first control grid, a second control grid, and a cathode, a first time constant circuit differentiating and coupling applied pulse signals to the first control grid of said tube to change the conducting state of said tube in response to a pulse leading edge, said differentiating circuit having a sufficiently long time constant to hold said tube in its changed state for a predetermined period in response to each pulse equal to or exceeding said period, said state changing back in response to a pulse trailing edge occurring during said period, a second time constant circuit connected to the anode acting electrode of said first tube to produce an integrated pulse having a waveform which increases constantly during the period said first tube's conducting condition is changed, a third time constant circuit receiving and differentiating said applied pulse signals and having a time constant shorter than that of said first time constant circuit, network means superposing the output of said third time constant circuit on the output of said second time constant circuit and coupling the combined outputs to the second control grid of said tube so as to produce pulses at the plate of said tube only when the superposition results in an amplitude which exceeds a preselected amplitude.

6. A pulse width discriminator comprising a first vacuum tube means having at least an anode, a control grid, and a cathode, a first time constant circuit differentiating and coupling applied pulse signals to the grid of said tube to change the conducting state of said tube in response to a pulse leading edge, said differentiating circuit having a sufficiently long time constant to hold said tube in its changed state for a predetermined period in response to each pulse equal to or exceeding said period, said state changing back in response to a pulse trailing edge occurring during said period, a second time constant circuit connected to the anode of said first tube to produce an integrated pulse having a waveform which increases constantly during the period said first tube's conducting condition is changed, a third time constant circuit receiving and differentiating said applied pulse signals and having a time constant shorter than that of said first time constant circuit, a second vacuum tube means having at least an anode, two control grids and a cathode, means coupling the output of said third time constant circuit to one of the control grids of said second tube, and means coupling the output of said second time constant circuit to the other of said control grids so as to produce at the anode of said second tube pulses only when the output of said third time constant circuit corresponding to the trailing edge of an input pulse occurs in time coincidence with the maximum amplitude attainable by the output of said second time constant circuit.

References Cited in the file of this patent

UNITED STATES PATENTS 2,211,942 White ------------------ Aug. 20, 1940

2,275,930 Torcheus -------------- Mar. 10, 1942
2,359,447 Seeley ------------------ Oct. 3, 1944
2,391,776 Fredendall -------------- Dec. 25, 1945
2,418,127 Labin ------------------ Apr. 1, 1947
2,517,618 Young, Jr. -------------- Aug. 8, 1950

FOREIGN PATENTS 528,192 Great Britain ------------ Oct. 24, 1940